Figure 1:
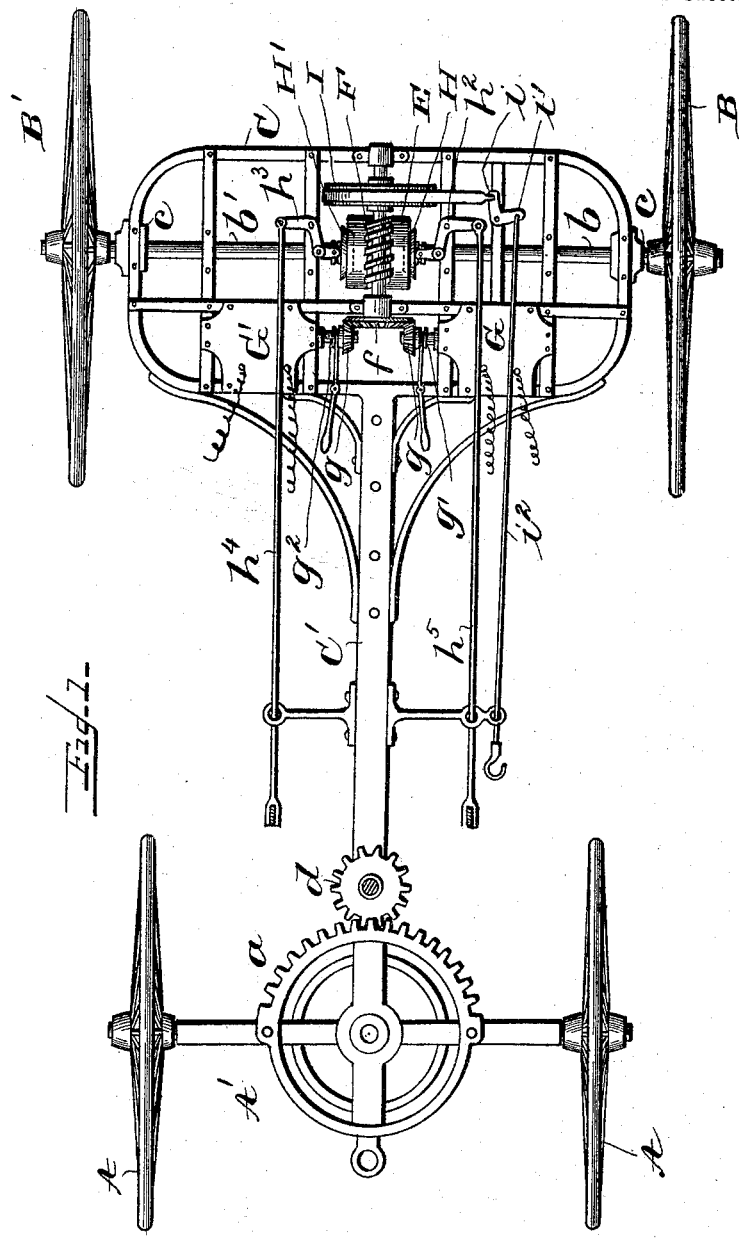

No. 612,506. Patented Oct. 18, 1898.
J. C. REUTER.
MOTOR VEHICLE.
(Application filed May 3, 1897.)
(No Model.) 2 Sheets—Sheet 1.

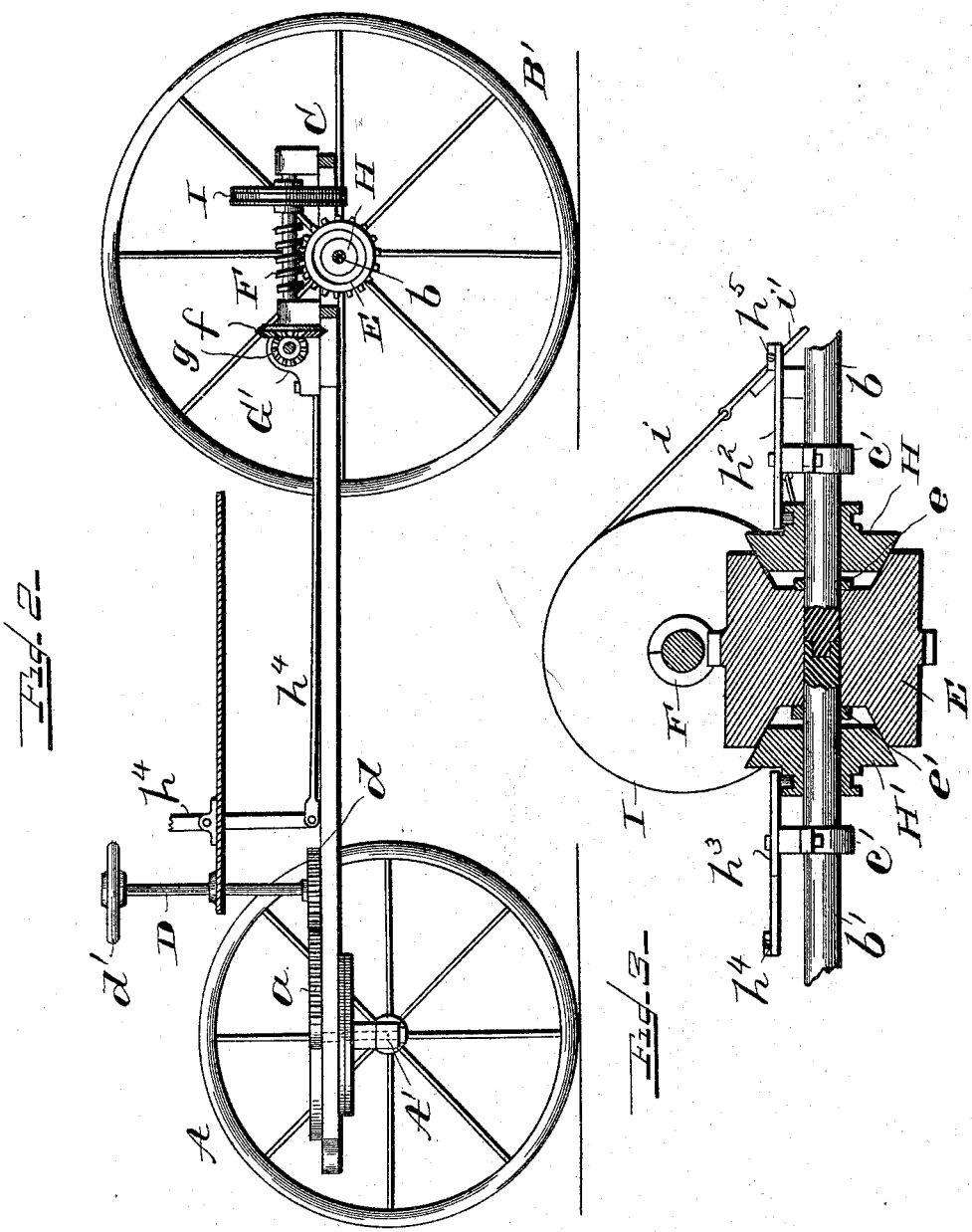

UNITED STATES PATENT OFFICE.

JOHN CHAS. REUTER, OF CHICAGO, ILLINOIS, ASSIGNOR TO LE ROY W. STEVENS, OF AUBURN, NEW YORK.

MOTOR-VEHICLE.

SPECIFICATION forming part of Letters Patent No. 612,506, dated October 18, 1898.

Application filed May 3, 1897. Serial No. 634,941. (No model.)

*To all whom it may concern:*

Be it known that I, JOHN CHAS. REUTER, a citizen of the United States, residing at Chicago, in the county of Cook and State of Illinois, have invented certain new and useful Improvements in Motor-Vehicles; and I do hereby declare the following to be a full, clear, and exact description of the invention, such as will enable others skilled in the art to which it appertains to make and use the same.

My present invention is an improvement in motor-vehicles; and it consists in certain new constructions and combinations of parts whereby very desirable results in that class of carriages are obtained.

In the accompanying drawings I have illustrated one form in which I have contemplated embodying my invention, and said invention is fully disclosed in the following description and claims.

In the drawings, Figure 1 is a plan view of the framework and operative parts of a motor-vehicle embodying my invention. Fig. 2 is a longitudinal vertical section. Fig. 3 is a vertical section in line with the axis of the rear wheels of the carriage.

In my carriage I employ two forward wheels A A and two rearward wheels B B'.

C is a framework supporting the mechanism for operating the rear wheels B B', which are the driving-wheels. To this framework is connected a reach C', which extends forward and is pivoted to the forward axle A'. I propose to employ the usual fifth-wheel, and the means for steering may be any preferred construction. In this I have shown a toothed sector $a$, operatively connected with the axle A', with which gears a pinion $d$, which is mounted on a vertical shaft D, pivoted in or upon the reach and having at its upper end a hand-wheel $d'$, by which the shaft and pinion may be turned to move the sector $a$ and axle A'. These constructions form no part of my invention and may be replaced by any other devices which will accomplish the result.

The rear axle is composed of two parts $b$ $b'$. Each of the axles $b$ $b'$ has two bearings $c$ $c'$, the bearing $c$ being near the wheel and the bearing $c'$ being near the center of the machine. The ends of the part axles $b$ $b'$ abut against each other or interlock, as shown, and upon these meeting ends is loosely mounted the drum E, carrying a worm-gear E', as shown on an enlarged scale in Fig. 3. This drum is held in place by the collars $e$ $e'$ on the shafts $b$ $b'$. The worm-gear E is engaged to operate the drum by the worm F, mounted in suitable bearings. The worm-shaft is provided at its forward end with a beveled gear $f$, which engages with two beveled pinions $g$ $g$ on two motor-shafts $g'$ $g^2$, which are in this instance connected directly to and operated by two electric motors G' G'. Other kinds of motors may be employed in lieu of those operated by electricity, if desired. These motors are arranged so as to turn the screw F in the same direction, the one assisting the other.

One of the motors may be used when one will be sufficient, as for level ground, and both brought into action when it is necessary to climb a hill or to pass over a piece of road presenting other difficulties, such as deep snow, sand, or mud.

The hub of the drum E has each end recessed, as shown, the walls of the recess inclining inwardly, forming the female members of two clutches. On the shafts $b$ $b'$ are mounted the two male members H H' of the clutches. These clutch members are splined upon the shafts $b$ $b'$ or otherwise connected with them, so as to be capable of sliding upon them longitudinally while rotating with them. These two clutches are controlled by two clutch-levers $h^2$ $h^3$ in a well-known way, and these levers are connected by links $h^4$ $h^5$ with vertically-disposed hand-levers within reach of the operator and in close or convenient proximity to the hand-wheel of shaft D. It will thus be seen that both of the wheels B B' can be used as driving-wheels, or when it may be found desirable either of the wheels B B' can be disconnected from the driving machinery and the whole work done by the other. This is of great advantage in turning.

In order to insure steadiness of motion, I place a balance-wheel I on the worm-shaft, and in connection with this I employ a strap-brake $i$ in order that the carriage may be quickly stopped. This brake-strap is connected to a bell-crank lever $i'$, which is in turn connected by link $i^2$ with a lever similar to the levers $h^4$ and $h^5$ near the front of the carriage.

It will be seen that by using the worm and worm-gear the vehicle or carriage will always remain stationary when stopped by stopping the driving-motors, as the worm prevents the wheels from moving when they are clutched to the worm-gear. It will also be seen that the carriage can be stopped without stopping the motors by disconnecting the clutches H H'. It is to be noted also that the clutches can be disconnected and the carriage permitted to coast, when so desired, and the carriage brought to a standstill by the use of the clutches, which will then act as friction-brakes.

In place of the conical clutch members I prefer to use the form of clutch in which friction-shoes are made to move outwardly and engage the inner side of a flange extending outwardly from the wheel carrying it. This form of clutch is too common to need further explanation here.

What I claim, and desire to secure by Letters Patent, is—

1. A motor-vehicle having two driving-wheels, a divided axle one part attached to each wheel, the motor-power for said vehicle and a train of gearing connecting said motor and wheels, including a gear-wheel for actuating both axles, and means for connecting and disconnecting said gear-wheel and each of said axles, substantially as described.

2. A motor-vehicle having two driving-wheels, a divided axle, one part attached to each wheel, two motors and a train of gearing connecting said motors and said axles, including a gear-wheel for driving both axles, and independent means for connecting and disconnecting each of said axles with said gear-wheel, substantially as described.

3. In a motor-vehicle, a divided axle each part having a driving-wheel secured thereto, a drum mounted concentrically with said axle, actuating devices therefor, and independently-operating clutch devices for connecting said axle parts to rotate with said drum and disconnecting them therefrom, substantially as described.

4. In a motor-vehicle, the combination with two motors, two driving-wheels, a single train of gearing connecting said motors and said wheels, and means for connecting and disconnecting said motors from said train of gearing, substantially as described.

5. In a motor-vehicle, the combination with the independently-movable driving-wheels, of two motors, a single train of gearing connecting said motors and said wheels, a brake for said gearing, means for disconnecting said motors from said gearing and means for disconnecting said wheels from said gearing, whereby the single brake can be made to serve to retard the motion of the motors or the motion of the wheels, substantially as described.

6. In a motor-vehicle, the combination with independently-movable driving-wheels, two motors, a train of gearing connecting said wheels and said motors, clutch mechanism connecting said wheels and said gearing, and clutch mechanism connecting the said motors and said gearing, substantially as described.

7. The combination with the wheels and their axles, of the drum mounted on said axles, means for actuating said drum and a clutch for connecting said drum with each axle, substantially as described.

In testimony whereof I affix my signature in presence of two witnesses.

JOHN CHAS. REUTER.

Witnesses:
JOHN E. McWILLIAMS,
T. O. BROWNING.